(12) United States Patent
Wu

(10) Patent No.: US 8,060,896 B2
(45) Date of Patent: Nov. 15, 2011

(54) METHOD AND DEVICE FOR PROTECTING SLOT-IN OPTICAL DISC DRIVE

(75) Inventor: Jen-Chen Wu, Taoyuan (TW)

(73) Assignee: Quanta Storage Inc., Taoyuan County (TW)

( * ) Notice: Subject to any disclaimer, the term of this patent is extended or adjusted under 35 U.S.C. 154(b) by 488 days.

(21) Appl. No.: 12/314,099

(22) Filed: Dec. 4, 2008

(65) Prior Publication Data

US 2009/0165028 A1 Jun. 25, 2009

(30) Foreign Application Priority Data

Dec. 25, 2007 (TW) .............................. 96150420 A

(51) Int. Cl.
*G11B 17/04* (2006.01)
(52) U.S. Cl. ........ 720/626; 720/620; 720/622; 720/609; 720/604; 720/601
(58) Field of Classification Search .................. 720/626, 720/622, 609, 604, 601
See application file for complete search history.

(56) References Cited

U.S. PATENT DOCUMENTS 7,934,225 B2 * 4/2011 Kuo et al. ..................... 720/645

* cited by examiner

*Primary Examiner* — Thong Q Le
(74) *Attorney, Agent, or Firm* — Bacon & Thomas, PLLC

(57) ABSTRACT

A method and device for protecting slot-in optical disc drive are provided. A first sensing switch is for detecting the action of an unloading unit, a second sensing switch is for detecting the action of a receiving unit, and a third sensing switch is for detecting the action of a positioning bar. A disc is inserted as the optical disc drive is at the initial state, and the states of the first, second and third sensing switches are detected. The transmission unit is activated to automatically load the disc as all sensing switches are turned on, and whether the state of the third sensing switch changes is checked. When the state of the third sensing switch changes, the extraction of the disc is detected, so the transmission unit is immediately reversed to execute the unloading of the disc, so as to protect the optical disc drive.

8 Claims, 6 Drawing Sheets

METHOD AND DEVICE FOR PROTECTING SLOT-IN OPTICAL DISC DRIVE

This application claims the benefit of Taiwan application Serial No. 96150420, filed Dec. 25, 2007, the subject matter of which is incorporated herein by reference.

BACKGROUND OF THE INVENTION

1. Field of the Invention

The invention relates in general to an optical disc drive, and more particularly to a method and a device for protecting slot-in optical disc drive by automatically extracting a disc when the abnormal extraction of the disc is detected in the course of loading the disc.

2. Description of the Related Art

Normally, optical disc drives are divided into tray type optical disc drive and slot-in optical disc drive according to the way of loading/unloading a disc. According to loading/unloading way of the tray type optical disc drive, the disc is placed in a receiving space of a tray, and the tray is moved into or extracted from the optical disc drive. As for the slot-in optical disc drive, the loading/unloading mechanism automatically sucks in the disc and further guides the disc to be positioned when the disc is disposed at the entrance of the optical disc drive or unloads the disc. The slot-in optical disc drive is user-friendly and is easy to be thinned.

In the course of loading a disc to a conventional slot-in optical disc drive, the user holds the disc and directly inserts the disc into the entrance of the optical disc drive. Then, the user pushes the disc into the optical disc drive. When the disc activates the detecting mechanism of the optical disc drive and the inserting depth of the disc is detected, the optical disc drive activates its transmission motor to drive the loading/unloading mechanism to automatically load the disc into the optical disc drive and further guides the disc to a predetermined position. Then, the loading/unloading mechanism uplifts a traverse having a spindle motor until the spindle motor is able to retain the disc by the central hole of the disc and to rotate the disc for the data to be retrieved.

In the course stated above, the disc is gradually moved into the optical disc drive. Before the disc is positioned, the disc is partly exposed outside the optical disc drive, and the user may extract the disc from the optical disc drive at any time. If the disc is extracted by the user after the transmission motor is already activated by the optical disc drive, the traverse, which is automatically uplifted would scratch or damage the disc that has not been completely extracted since the loading/unloading mechanism continues the loading of the disc at fast speed. This is because when the disc is extracted, the optical disc drive still continues to drive the loading/unloading mechanism to load the disc at a fast speed. Furthermore, the force to extract the disc will cause the guiding rod of the loading/unloading mechanism to be curved or deformed and make the optical disc drive jammed or damaged.

To prevent the damage caused by abnormal operation, as disclosed in the prior art of the Taiwanese Patent Publication No. 093115463, a releasing mechanism is disposed on the guiding rod of the loading/unloading mechanism. When the force received by the guiding rod is over a predetermined limit, the releasing mechanism releases a locking mechanism, such that the receiving end of the guiding rod can rotate freely to avoid the deformation of the guiding rod. However, the releasing mechanism does not stop the transmission motor, and if the user extracts the disc too late, the traverse that is uplifted fast will still scratch or damage the disc. Beside, the above protection mechanism is disposed on the guiding rod, which is narrow and small, not only making the manufacturing and assembly of the optical disc drive more difficult and costive but also not favoring the miniaturization of the optical disc drive. Thus, the manufacturer of slot-in optical disc drive still has many problems to resolve regarding the protection during abnormal operation.

SUMMARY OF THE INVENTION

The invention is directed to a method for protecting slot-in optical disc drive. During the course of loading a disc, the states of several sensing switch are detected. As one of the sensing switches not interfered by the loading/unloading mechanism changes its state, the extraction of the disc is detected, the unloading of the disc is performed so as to protect the optical disc drive and the disc.

According to a first aspect of the present invention, a device for protecting slot-in optical disc drive is provided. A positioning bar moves along with the disc. When the disc is abnormally extracted afar the transmission motor is activated, the positioning bar reversely touches the sensing switch to change its state, and then the transmission motor is reversed to execute the unloading of the disc, so as to protect the optical disc drive.

To achieve the above object, the method for protecting slot-in optical disc drive is applied in a slot-in optical disc drive. The slot-in optical disc drive has a transmission unit for providing power to move the sliding member, which is linked to a loading unit for driving a loading rod to load a disc. One end of the unloading unit is driven by the sliding member, and the other end of the unloading unit rotates the unloading rod to guide or to extract the disc. The receiving unit is used for guiding the disc to be loaded. Furthermore, the positioning bar and the unloading rod work together to guide the disc to be positioned. The sensing unit has a first sensing switch for detecting the action of the unloading unit, a second sensing switch for detecting the action of the receiving unit, and a third sensing switch for detecting the action of the positioning bar. The protection method includes the following steps. A disc is inserted as the disc drive is at an initial state, and the states of the first sensing switch, the second sensing switch and the third sensing switch are detected. When all sensing switches are turned on, the transmission unit is activated to automatically load the disc, and the state of the third sensing switch is detected. When the state of the third sensing switch changes, the extraction of the disc is detected, and the transmission unit is immediately reversed to execute the unloading of the disc, so as to protect the optical disc drive.

The device for protecting a slot-in optical disc drive has a transmission unit for providing power to move the sliding member, which is linked to a loading unit for rotating a loading rod to load a disc. One end of the unloading unit of the linking rod mechanism is driven by the sliding member, and the other end of the unloading unit rotates the unloading rod to guide or extract the disc. The receiving unit is used for guiding the disc to be loaded, wherein the receiving unit has a positioning bar that touches the disc during the course of loading/unloading the disc. The sensing unit has the first sensing switch disposed in the moving path of the unloading unit, the second sensing switch disposed in the moving path of the receiving unit, and the third sensing switch disposed beside the moving path of the positioning bar. In the course of loading the disc, as the state of each sensing switch is changed, if the third sensing switch detects that the positioning bar is reversely moved due to that the state of the third sensing switch is changed again, the transmission unit is reversed to execute unloading the disc.

The invention will become apparent from the following detailed description of the preferred but non-limiting embodiments. The following description is made with reference to the accompanying drawings.

DETAILED DESCRIPTION OF THE INVENTION

Figure 1:
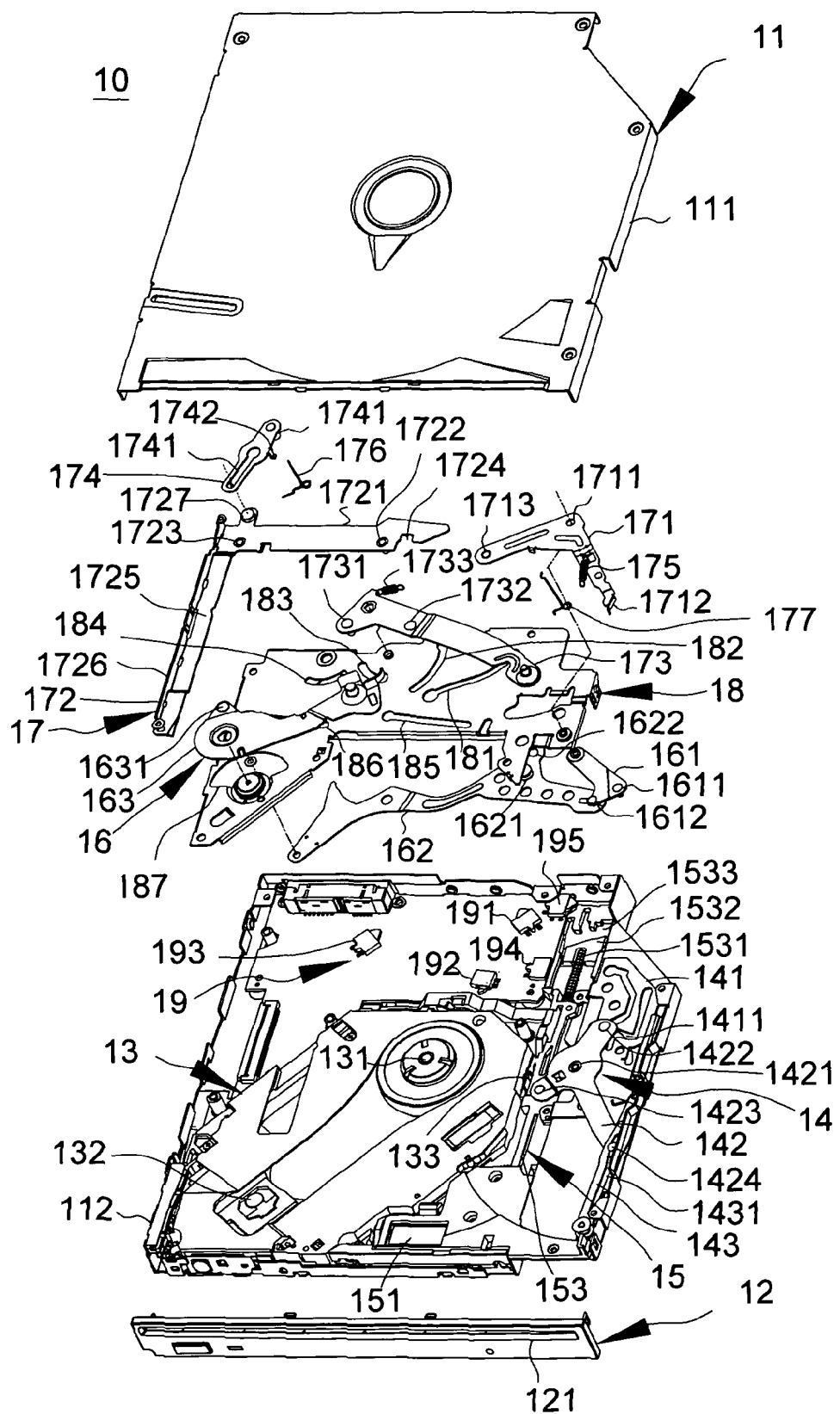
FIG. 1 shows an exploded diagram an optical disc drive according to a preferred embodiment of the invention.

Referring to FIG. 1, an exploded diagram of an optical disc drive according to a preferred embodiment of the invention is shown. The optical disc drive 10 of embodiment of the invention, is a slot-in optical disc drive for example, and includes a casing 11, a panel 12, a traverse 13, a loading unit 14, a transmission unit 15, an unloading unit 16, a receiving unit 17, a substrate 18 and a sensing unit 19. When the disc D (referring to FIG. 4) is inserted into the optical disc drive 10, the unloading unit 16 and the receiving unit 17 are moved to touch and activate the sensing unit 19, so the sensing unit 19 is able to sense that the disc D is inserted into the optical disc drive 10. Then, the transmission unit 15 drives the loading unit 14 to load the disc D into the optical disc drive 10 and drives the receiving unit 17 to guide the disc D to a predetermined position, then the traverse 13 is uplifted to be embedded into the disc D, so as to rotate the disc D.

The casing 11 includes an upper casing 111 and a lower casing 112, wherein the upper casing 111 and the lower casing 112 form a hollowed space that is used for receiving a loading/unloading mechanism that drives the disc D to enter or to exit the casing 11. The panel 12 is disposed at the front end of the casing 11 and has an entrance 121 in the shape of a long slot through used for the insertion or extraction of the disc D. The traverse 13 tilting to one corner from the center of the optical disc drive 10 is pivotally disposed at the front end close to the lower casing 112. The part of the traverse 13 close to the center of the optical disc drive 10 has a spindle motor 131 used for rotating the disc D. A pick-up head 132 is disposed on the traverse 13 to move in the radial direction of the spindle motor 131 for reading/writing the disc D. A sliding pin 133 of the traverse 13 is protruded from a lateral side of the traverse 13 close to the spindle motor 131.

Figure 2:
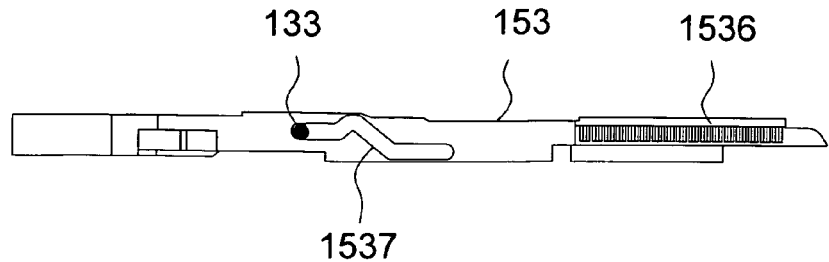
FIG. 2 shows a side view of a sliding member.

The transmission unit 15 is disposed at a lateral side close to the traverse 13 for providing transmission power to the optical disc drive 10. The transmission unit 15 rotates a gear set 152 (shown in FIG. 3) by a transmission motor 151 disposed at the front end of the optical disc drive 10 so as to drive a sliding member 153 extended to the rear end to slide forward and backward. An unloading spring 1531 is fixed on the sliding member 153. One end of the unloading spring 1531 presses a sliding block 1532 that is slidable. The sliding block 1532 and the rear end wall of the sliding member 153 form a sliding slot 1533. Referring to FIG. 2, a side view of the sliding member 153 is shown. A rack 1536 is disposed on a lateral side at the front of the sliding member 153, and is driven by the gear set 152. An ascending/descending slot 1537 is disposed near the central part of the sliding member 153. The sliding pin 133 of the traverse 13 is embedded into the ascending/descending slot 1537, and is able to slide forward and backward along with the sliding member 153 as well as to ascend or descend with respect to the ascending/descending slot 1537, such that one side of the traverse 13 is turned to ascend or descend.

Referring to FIG. 1, the loading unit 14 is disposed on the other side of the transmission unit 15 corresponding to the traverse 13. The loading unit 14 includes a sliding plate 141, a transmission rod 142 and a loading rod 143. One side of the sliding plate 141 is fixed on the sliding member 153, so the sliding plate 141 is able to slide with the sliding member 153 along the lower casing 112. A guiding slot 1411 is disposed on the sliding plate 141. The transmission rod 142 is a Y-shaped rod, and the center 1421 of the transmission rod 142 is fixed on the lower casing 112. A first guiding pin 1422 protruded downward is fixed at one end of the transmission rod 142 and is embedded into the guiding slot 1411. A second guiding pin 1423 protruded downward is fixed at one end of the transmission rod 142 and is suspended above the sliding member 153. A third guiding pin 1424 protruded downward is fixed at the other end of the transmission rod 142. One end of the loading rod 143 is fixed on one side of the lower casing 112. The loading rod 143 has a strip slot 1431 along its axial direction, and the third guiding pin 1424 is embedded into the strip slot 1431. Furthermore, the third guiding pin 1424 can slide in the strip slot 1431 so as to rotate the loading rod 143.

A substrate 18 disposed at the upper rear end of the optical disc drive 10 covers the sensing unit 19 and the rear side of the sliding member 153. A first arced slot 181, a second arced slot 182, a third arced slot 183, a fourth arced slot 184, a first skewed slot 185 and a second skewed slot 186 are formed on the substrate 18. A fan-shaped slot 187 is formed at a corner of the substrate 18.

Figure 3:
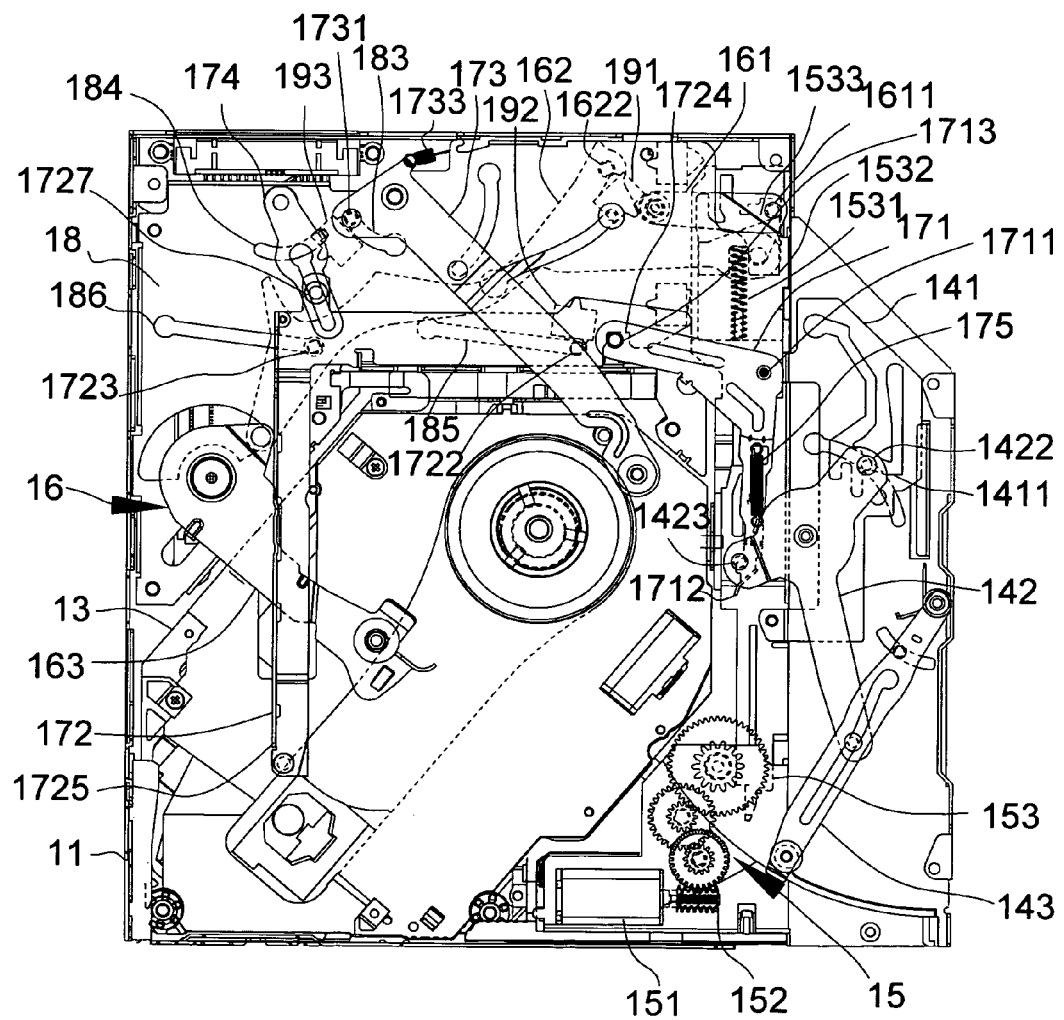
FIG. 3 shows a top view of the internal structure of the optical disc drive at an initial state.

Refer to both FIG. 1 and FIG. 3. FIG. 3 shows a top view of the internal structure of the optical disc drive 10 at an initial state. The receiving unit 17 includes a buckling member 171, a disc receiving rod 172, a positioning bar 173, a reset rod 174, an extension spring 175, a reset torsion spring 176 and a dragging spring 177. The rotation center 1711 of the L-shaped buckling member 171 and the dragging spring 177 are together fixed on the substrate 18 disposed above the sliding member 153. One end of the buckling member 171 is protruded upward to form a blocking edge 1712 suspended in the moving path of the second guiding pin 1423 of the transmission rod 142. The other end of the buckling member 171 is protruded to form a buckling pin 1713. One end of the dragging spring 177 is fixed at the peripheral of the buckling member 171, such that the end of the buckling member 171 at which the buckling pin 1713 is disposed remains facing the center of the optical disc drive 10. One end of the extension spring 175 is fixed at the end of the buckling member 171, at which the blocking edge 1712 is disposed, and approximately passes through the rotation center 1711 to avoid interfering with the rotation of the buckling member 171. The other end the extension spring 175 is fixed on the transmission rod 142, such that the transmission rod 142 drives the receiving end of the loading rod 143 to move toward the front end of the optical disc drive 10.

The disc receiving rod 172 is an L-shaped rod disposed on the substrate 18 and opposite to the buckling member 171. The disc receiving rod 172 extended toward a flat side 1721 at the center of the optical disc drive 10 has a first guiding pin 1722 and a second guiding pin 1723 respectively embedded into the first skewed slot 185 and the second skewed slot 186, such that the disc receiving rod 172 can cross-slide along the first skewed slot 185 and the second skewed slot 186. When the first guiding pin 1722 passes through the first skewed slot 185, the first guiding pin 1722 activates the second sensing switch 192 located in the moving path. The terminal of the flat side 1721 is indented to form a groove 1724. A straight side 1725 of the disc receiving rod 172 is parallel to a lateral side of the optical disc drive 10 and is protruded from the flange 1726 to guide the disc D. The disc receiving rod 172 has a sliding buckle 1727 extended near the center. One end of the reset rod 174 can be rotatably fixed on the substrate 18 near the sliding buckle 1727. The reset rod 174 has a movable slot 1741 into which the sliding buckle 1727 is embedded. A bulges plate 1742 is extended from a lateral side of the reset rod 174, passes through the fourth arced slot 184, and is pressed by the reset torsion spring 176 disposed under the substrate 18 such that the disc receiving rod 172 is reset toward the front end of the optical disc drive 10.

One end of the positioning bar 173 can be rotatably fixed at the rear of the middle of the substrate 18. The edge of the positioning bar 173 is protruded downward to form a first antenna 1731, which passes through the third arced slot 183 to activate the third sensing switch 193 disposed nearby. The middle part of the positioning bar 173 is protruded downward to form a branch pin 1732 embedded into the second arced slot 182. The branch pin 1732 can slide in the second arced slot 182 such that the supporting strength of the positioning bar 173 is improved. A reset extension spring 1733 is disposed near the fixing end of the positioning bar 173, wherein one end of the reset extension spring 1733 is fixed on the positioning bar 173 and the other end is fixed on the substrate 18, such that the other end of the positioning bar 173 is extended forward near the spindle motor 131.

The unloading unit 16 includes a first linking rod 161, a second linking rod 162 and an unloading rod 163. The first linking rod 161 and the second linking rod 162 are disposed under the substrate 18, and the unloading rod 163 is disposed above the substrate 18. One end of the first linking rod 161 is rotatably fixed under the substrate 18, and the other end is protruded downward to form a first driving pin 1611 and the second driving pin 1612. The first driving pin 1611 is embedded into the sliding slot 1533 of the sliding member 153 and is driven by the sliding member 153. The second linking rod 162 is crossly disposed under the substrate 18, wherein one end of the second linking rod 162 is connected to the second driving pin 1612, the other end is extended to the underneath of the fan-shaped slot 187 of the substrate 18. A guiding pin 1621 protruded upward near the middle of the second linking rod 162 is embedded into the first arced slot 181 to guide and support the second linking rod 162. A second antenna 1622 protruded downward near the guiding pin 1621 can activate the first sensing switch 191 disposed nearby. One end of the unloading rod 163 is rotatably fixed above the center of the fan-shaped slot 187, and the edge of the fixing end is protruded downward to form a fixing pin 1631. The fixing pin 1631 passing through the fan-shaped slot 187 is rotatably connected to one end of the second linking rod 162 disposed underneath, such that the transmission unit 15 rotates the unloading rod 163 via the first linking rod 161 and the second linking rod 162, and the other end of the unloading rod 163 is tilted and is moved to be near the spindle motor 131.

Besides, the sensing unit 19 includes a first sensing switch (SW1) 191, a second sensing switch (SW2) 192, a third sensing switch (SW3) 193, a fourth sensing switch (SW4) 194 and a fifth sensing switch (SW5) 195, and each of the above sensing switches can be a limit switch. The sensing switches of the sensing unit 19 are scattered and disposed in the rear end of the lower casing 112. The fourth sensing switch 194 and the fifth sensing switch 195 are disposed next to the rear lateral side of the sliding member 153 for sensing the terminal point of loading and unloading a disc respectively, so as to cut off the power of the transmission unit 15. The first sensing switch 191, the second sensing switch 192, the third sensing switch 193 respectively work with the unloading unit 16, the disc receiving rod 172 and the positioning bar 173 to detect the state of traverse, and further determine whether to load or to unload the disc D according to the change in the state of each switch. Thus, a protection device of optical disc drive of the embodiment of the invention is formed.

In FIG. 3, the optical disc drive 10 is at an initial state (before loading a disc). The sliding member 153 is disposed near the rear end of the casing 11 and the sliding plate 141 is also disposed at the rear end, such that the transmission rod 142, when functioned by the extension spring 175, enables the first guiding pin 1422 to be engaged with the guiding slot 1411 and makes the receiving end of the loading rod 143 partly extended near the inner side of the optical disc drive 10. Meanwhile, the buckling member 171, when functioned by the dragging spring, also enables the buckling pin 1713 to be engaged into the groove 1724 of the disc receiving rod 172. When the reset rod 174 is pressed by the reset torsion spring, the disc receiving rod 172 holds at the location near the inner side of the optical disc drive 10, and the first guiding pin 1722 makes the second sensing switch 192 working at ON state. Besides, when the positioning bar 173 is dragged by the reset extension spring 1733, one end of the positioning bar 173 is extended forward and near the spindle motor 131, and the first antenna 1731 of the positioning bar 173 touches and activates the third sensing switch 193 to work at ON state. The first driving pin 1611 of the first linking rod 161 of the unloading unit 16 is restricted by the first sliding slot 1533 of the sliding member 153 and halts in the sliding slot 1533, such that the second linking rod 162 makes one end of the unloading rod 163 tilted and extended toward the spindle motor 131, and makes the second antenna 1622 of the second linking rod 162 touch and activate the first sensing switch 191 to work at ON state.

Figure 4:
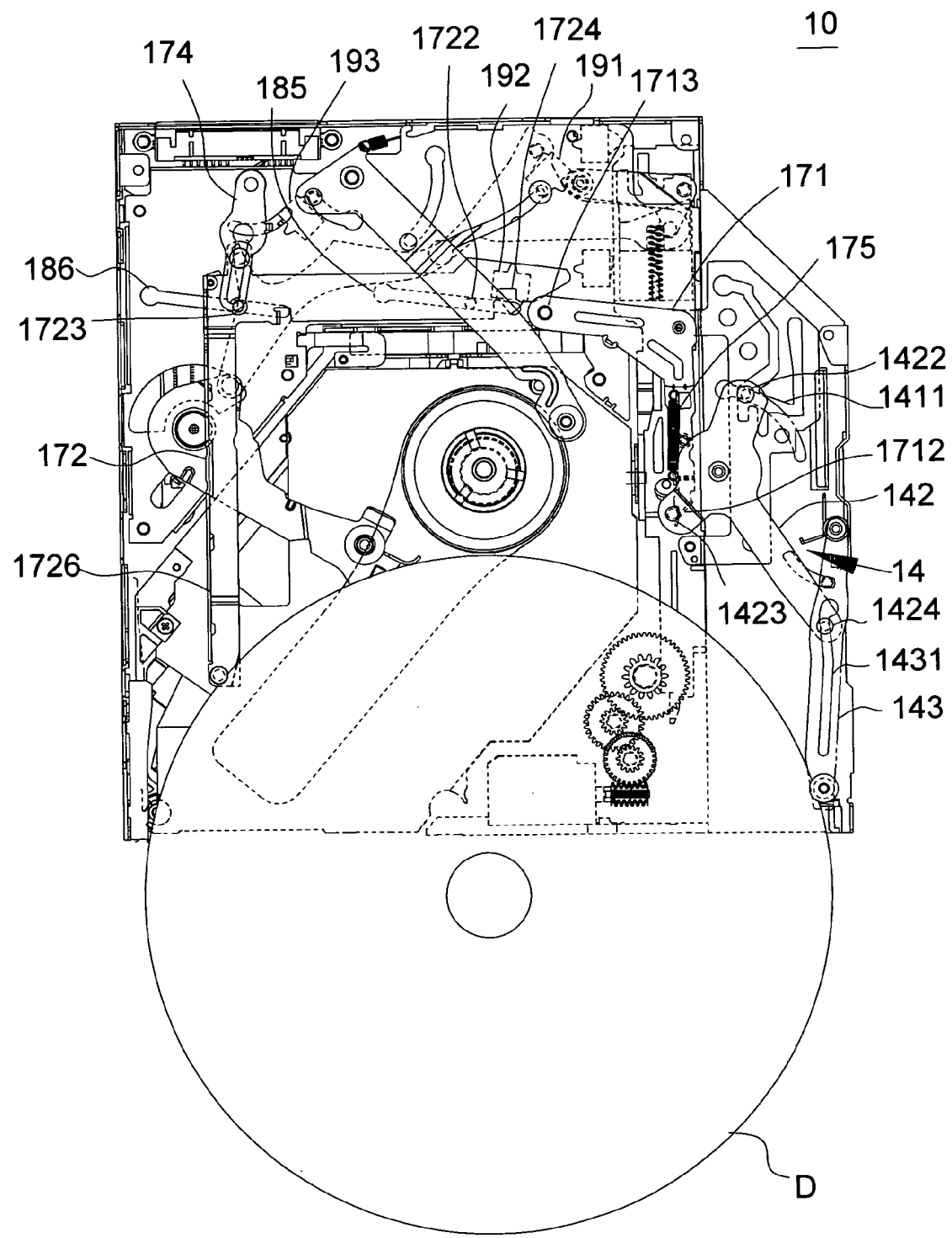
FIG. 4 shows a top view of the optical disc drive of the embodiment with a disc being inserted thereto.

As shown in FIG. 4, the optical disc drive 10 of the embodiment of the invention guides the disc D to be loaded. When the disc D is inserted into optical disc drive 10, one side of the disc D presses a lateral side of the optical disc drive 10 and the other side of the disc D is pushed by the user. The disc D touches the loading unit 14 and pushes the receiving end of the loading rod 143, such that the loading rod 143 is gradually expanded to one side, and the strip slot 1431 is moved for driving the third guiding pin 1424 to slide. The transmission rod 142 is then driven to rotate against the extension spring 175, such that the first guiding pin 1422 slides along the guiding slot 1411 and at the same time rotates the second guiding pin 1423 to push the blocking edge 1712 protruded from the buckling member 171, such that the buckling member 171 rotates against the dragging spring 177 (shown in FIG. 1) and makes the buckling pin 1713 detached from the groove 1724 of the disc receiving rod 172. The flange 1726 protruded from the disc receiving rod 172 then receives a pushing force generated when the disc D is inserted into the optical disc drive 10 to resist the reset rod 174, and the first guiding pin 1722 and the second guiding pin 1723 are moved in parallel to a lateral side of optical disc drive device 10 along the first skewed slot 185 and the second skewed slot 186 respectively. Meanwhile, the first guiding pin 1722 is moved away from the second sensing switch 192 so the second sensing switch 192 shifts to OFF state.

Figure 5:
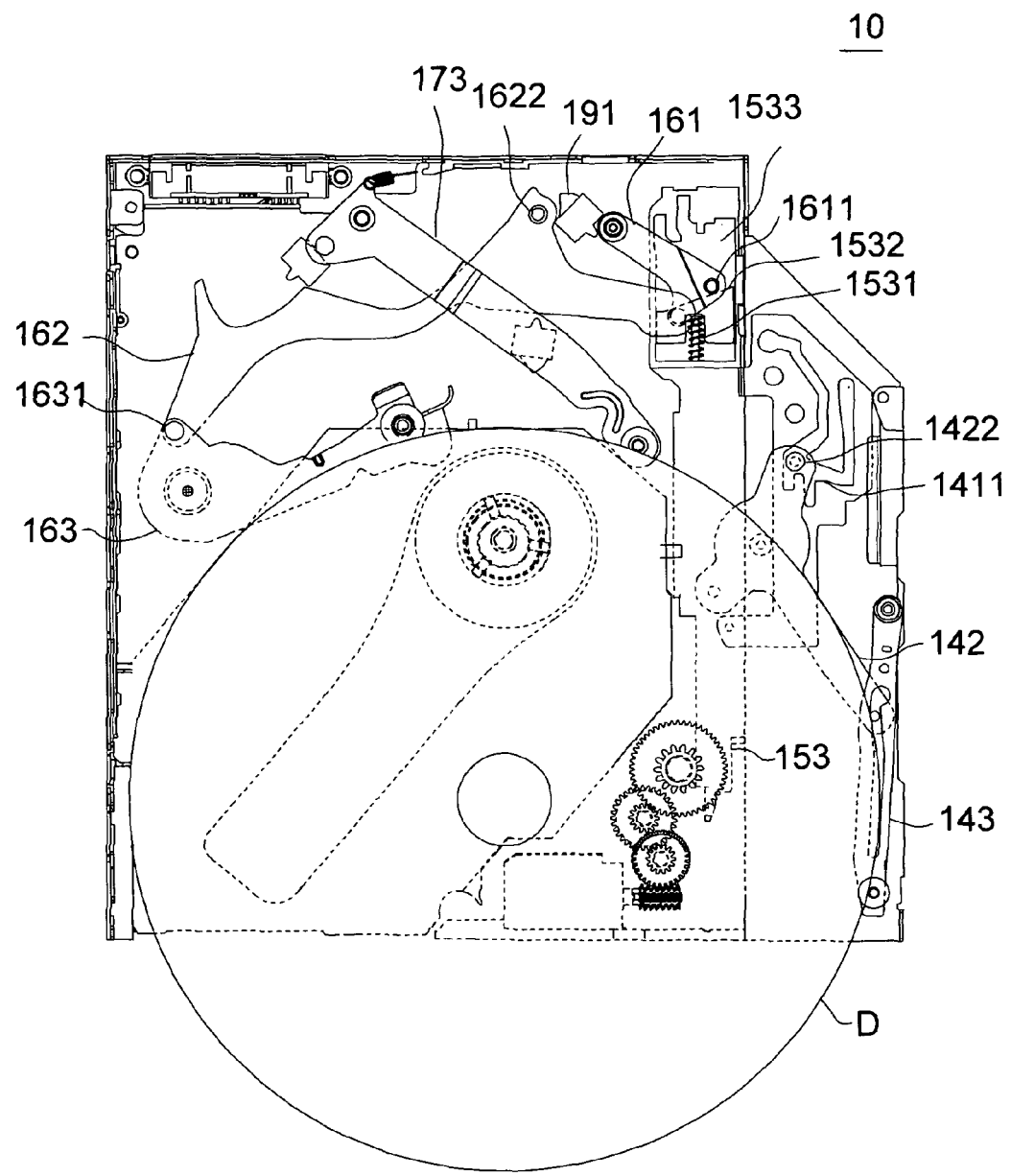
FIG. 5 shows a top view of the optical disc drive of the embodiment with a disc being loaded thereon.
Figure 6:
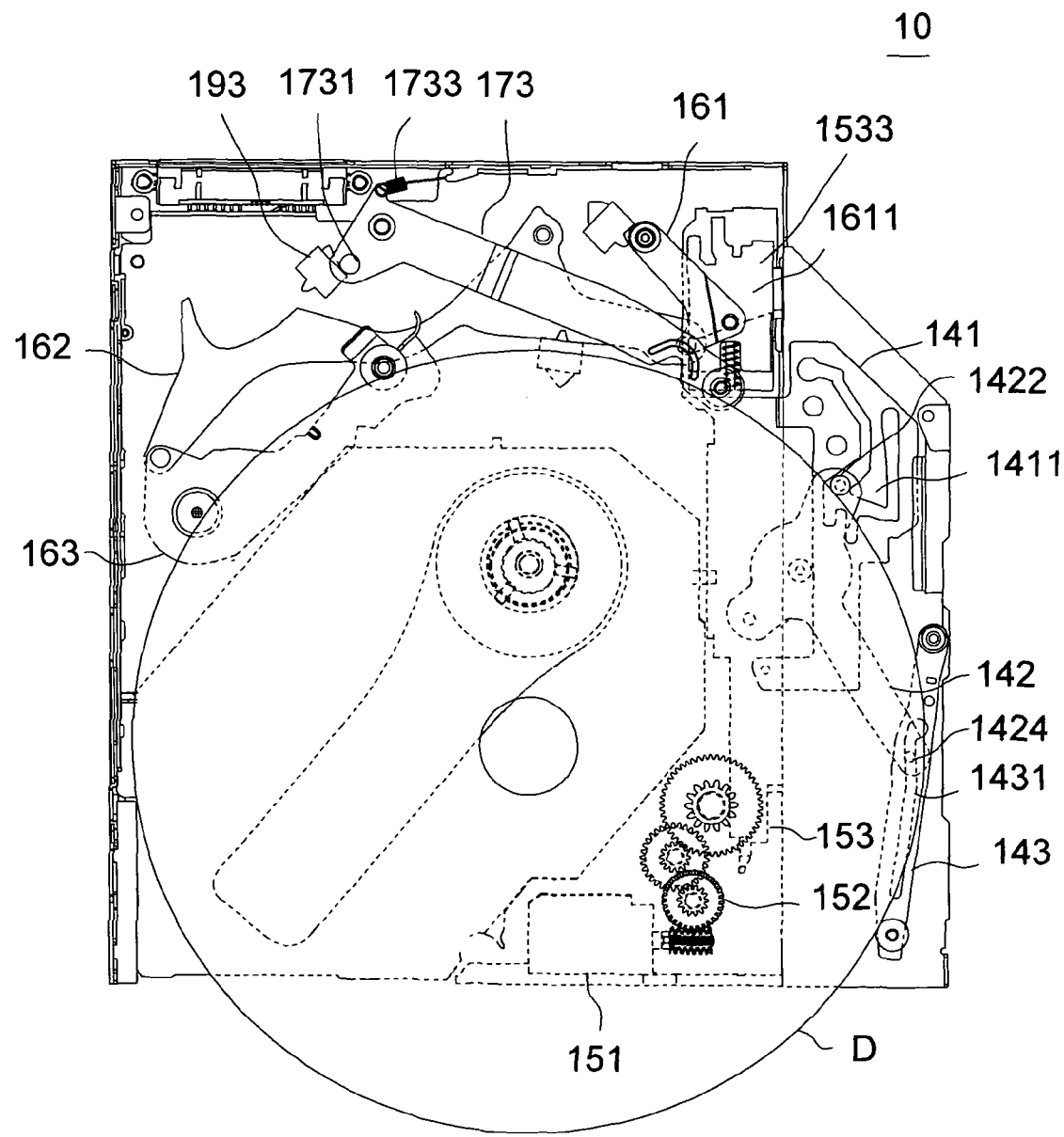
FIG. 6 shows a top view of the optical disc drive of the embodiment at an operation state.

Referring to FIG. 5 and FIG. 6, the operation of the protection device of the optical disc drive of the embodiment of the invention is shown. As shown in FIG. 5, when the disc D continues to be inserted into the optical disc drive 10, the disc D pushes the loading rod 143 to move aside and to drive the transmission rod 142 to rotate such that the first guiding pin 1422 slides along the guiding slot 1411. Meanwhile, the edge of the disc D which is inserted deep into the optical disc drive 10 will push back the unloading rod 163 and the receiving end of the positioning bar 173 which are more protruded. The unloading rod 163, which is pushed backward, generates rotation and applies a force to the second linking rod 162 via the fixing pin 1631, such that before the sliding member 153 is moved, the first linking rod 161 rotates the first driving pin 1611 to push the sliding block 1532 against the unloading spring 1531. Then the first driving pin 1611 moves along the sliding slot 1533 and makes the second antenna 1622 disposed on the second linking rod 162 be detached from the first sensing switch 191 so the first sensing switch 191 turns to be at OFF state. Next, as shown in FIG. 6, the edge of the disc D which continues to be inserted deeper into the optical disc drive 10 will push the positioning bar 173 to resist the dragging force of the reset extension spring 1733 and generate rotation. Then, the first antenna 1731 is detached from the third sensing switch 193 so the third sensing switch 193 becomes at OFF state. The optical disc drive 10 immediately activates the transmission motor 151 to rotate the gear set 152 and to drive the sliding member 153 to move forward. The sliding member 153 also drives the sliding plate 141 to move forward at the same time, rotates the transmission rod 142 via the first guiding pin 1422 embedded in the guiding slot 1411, and makes the third guiding pin 1424 slide in the strip slot 1431 such that the loading rod 143 rotates to load the disc D. The sliding member 153, which is moved forward, moves the first driving pin 1611 via the sliding slot 1533 such that the first linking rod 161 generates rotation and rotates the unloading rod 163 backward via the second linking rod 162. The sliding member 153 further work together with the positioning bar 173 to guide the disc D to be positioned, so the partly exposed disc D can be fast loaded into the optical disc drive 10 automatically.

If the partly exposed disc D is immediately extracted as soon as the transmission motor 151 is activated when the first antenna 1731 is detached from the third sensing switch 193 and the third sensing switch 193 works at OFF state, the loading rod 143, which is driven by the sliding member 153 and contacts the outer edge of the disc D, will be moved aside. To avoid the loading rod 143 being moved and deformed, the positioning bar 173 pulled back by the reset extension spring 1733 rotates forward along with the disc D that is extracted, and the first antenna 1731 again touches the third sensing switch 193 so the third sensing switch 193 again works at ON state (shown in FIG. 5). Once the third sensing switch 193 changes to ON state from OFF state, the optical disc drive 10 immediately reverses the transmission motor 151, such that the gear set 152 is reversed and drives the sliding member 153 to move backward to unload the disc. When the sliding member 153 moves backward, the sliding member 153 also drives the sliding plate 141 to move backward, rotates the transmission rod 142 by way of the first guiding pin 1422 embedded into the guiding slot 1411, and slides in the strip slot 1431 by way of the third guiding pin 1424 such that the loading rod 143 is reversed and moved to a lateral side of the optical disc drive 10 for the disc D to be extracted smoothly. As the transmission motor 151 has a high speed of rotation, the speed allows the loading rod 143 to be moved to the lateral side when the disc D is extracted lest the loading rod 143 might be deformed. The unloading mechanism prevents the traverse 13 from being uplifted lest the disc D that has not yet been extracted completely might be scratched or damaged.

Figure 7:
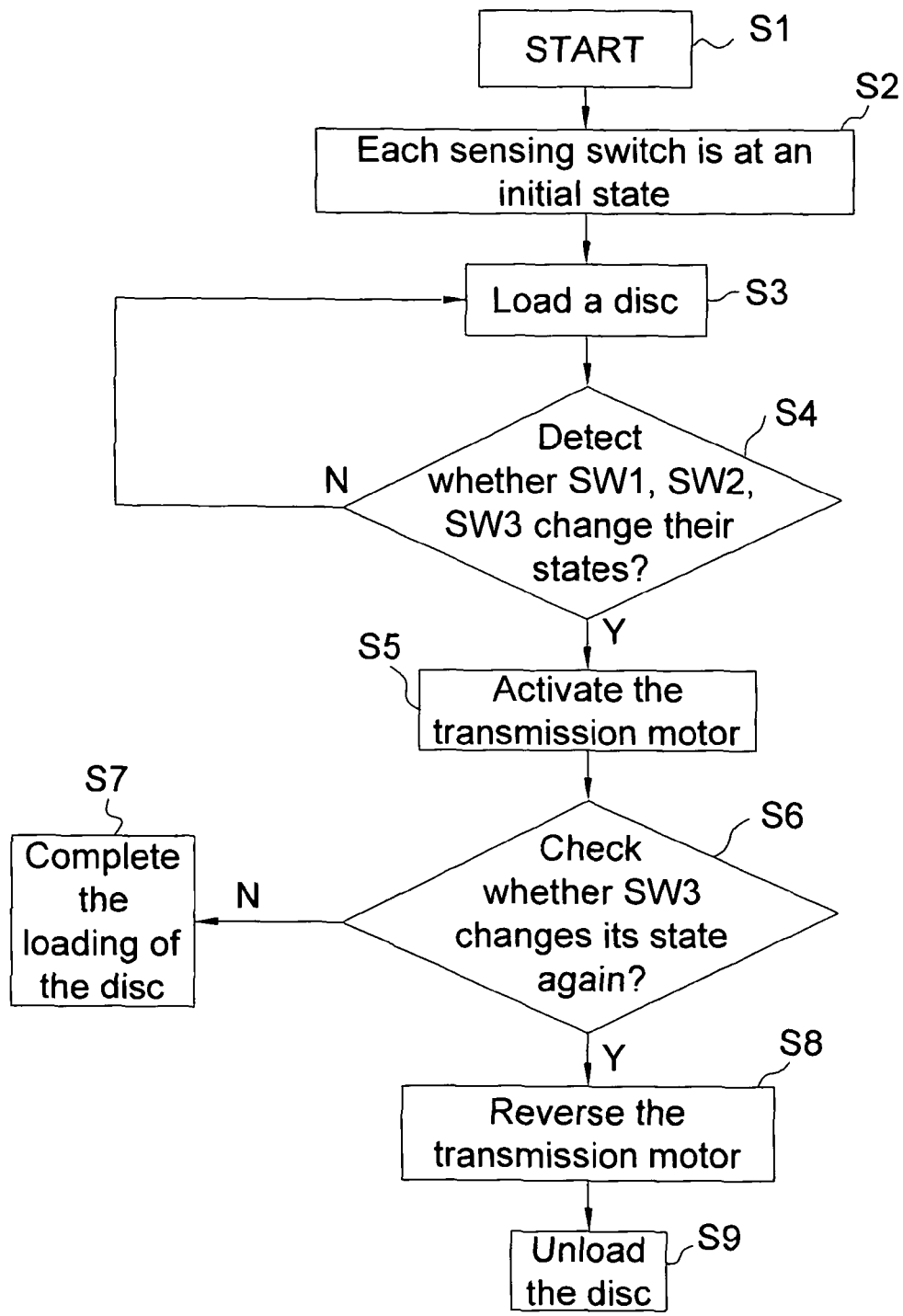
FIG. 7 shows a flowchart of a method for protecting an optical disc drive according to the embodiment of the invention.

As indicated in FIG. 7, a flowchart of a method for protecting slot-in optical disc drive of the embodiment of the invention is shown. According to the method for protecting slot-in optical disc drive, when the disc is abnormally extracted, the positioning bar and the sensing switch immediately control the optical disc drive to unload the disc. Detailed steps for protecting the optical disc drive and the disc are disclosed below. Firstly, the method begins at step S1 that the disc starts to be loaded in. Next, the method proceeds to step S2, the optical disc drive is at an initial state, and the first sensing switch (SW1), the second sensing switch (SW2) and the third sensing switch (SW3) work at a first state of the initial state. The first state is, for example, ON state. Then, the method proceeds to step S3, the disc is inserted into the optical disc drive, and the disc is loaded in. After that, the method proceeds to step S4, the states of the first sensing switch (SW1), the second sensing switch (SW2) and the third sensing switch (SW3) are detected to determine if the sensing switches all change to a second state (OFF state). If not all of the first sensing switch (SW1), the second sensing switch (SW2) and the third sensing switch (SW3) work at OFF state, then the method returns to step S3 to continue loading in the disc. If the first sensing switch (SW1), the second sensing switch (SW2) and the third sensing switch (SW3) all work at OFF state, then the method proceeds to step S5 to immediately activate the transmission motor. In step S6, whether the third sensing switch (SW3) changes to the first state (ON state) is detected. If the third sensing switch (SW3) does not change to ON state, then the method proceeds to step S7 to complete loading the disc. If the third sensing switch (SW3) changes to ON state, then the method proceeds to step S8 to reverse the transmission motor to unload the disc. Lastly, the method proceeds to step S9, the unloading of the disc is completed, and the disc is partly exposed outside the optical disc drive for the user to remove.

According to the method and device for protecting slot-in optical disc drive disclosed in the invention, in the course of loading a disc, when the disc is abnormally extracted after the transmission motor is activated, the positioning bar moves forward with the disc to reversely touch the third sensing switch so as to change the state of the switch and immediately reverse the transmission motor to execute the unloading of the disc. The invention not only prevents the loading rod from being curved and deformed which may damage the optical disc drive but also avoids the traverse being uplifted which may scratch or damage the disc that is not completely extracted. Thus, the optical disc drive and the disc are well protected.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A slot-in optical disc drive protection method applied in a slot-in optical disc drive, wherein the slot-in optical disc drive has a transmission unit for providing power to move a sliding member, which is linked to a loading unit for rotating a loading rod to load a disc, one end of a unloading unit is driven by the sliding member, and the other end of the unloading unit rotates an unloading rod to guide or to extract the disc, a receiving unit is used for guiding the disc to be loaded, a positioning bar and the unloading rod work together to guide the disc to be positioned, a sensing unit has a first sensing switch for detecting the action of the unloading unit, a second sensing switch for detecting the action of the receiving unit, and a third sensing switch for detecting the action of the positioning bar, the protection method comprises the following steps:

(1) starting to insert a disc;
(2) detecting whether the first sensing switch, the second sensing switch and the third sensing switch are all in function, if no, the method returns to step (1), otherwise, the method proceeds to step (3);
(3) starting the transmission unit to load the disc automatically; and
(4) checking whether the state of the third sensing switch is changed, if no, the disc is continuously loaded, otherwise, the transmission unit is reversed to execute the unloading of the disc, whether the positioning bar is reversed is determined by checking whether the state of the third sensing switch changes such that the disc is detected to be extracted, the sliding member is immediately reversed when the disc is detected to be extracted, and the loading unit and the unloading unit are driven to extract the disc automatically.

2. The slot-in optical disc drive protection method according to claim 1, wherein the optical disc drive is at an initial state when the step (1) of inserting the disc begins.

3. The slot-in optical disc drive protection method according to claim 2, wherein the optical disc drive is at an initial state, the first sensing switch, the second sensing switch and the third sensing switch are all at a first state.

4. The slot-in optical disc drive protection method according to claim 3, wherein the action in the step (2) refers to each sensing switch being changed to a second state from the first state.

5. The slot-in optical disc drive protection method according to claim 4, wherein the first state is ON state, and the second state is OFF state.

6. The slot-in optical disc drive protection method according to claim 4, wherein the first state is OFF state, and the second state is ON state.

7. The slot-in optical disc drive protection method according to claim 3, wherein in the step (3), the transmission unit provides power to move the sliding member, and the sliding member drives the loading unit and the unloading unit to load the disc automatically.

8. The slot-in optical disc drive protection method according to claim 1, wherein in the step (4), the change of state of the third sensing switch depends on whether the third sensing switch changes to the first state from a second state.

* * * * *